2,949,454
Patented Aug. 16, 1960

2,949,454

CERTAIN 1,3-DIPHENYL-2-THIOUREAS

Renat Herbert Mizzoni, Long Valley, N.J., assignor to Ciba Pharmaceutical Products, Inc., Summit, N.J., a corporation of New Jersey No Drawing. Filed Nov. 28, 1958, Ser. No. 776,749

2 Claims. (Cl. 260—240)

The present invention concerns 2-thiourea compounds. more particularly, it relates 1,3-diphenyl-2-thiourea, in which each of the phenyl radicals contains in the 4-position a group of the formula Py—$(CH=CH_n)$—, in which Py represents a pyridyl group and $n$ stands for a whole number from 1 to 2, salts thereof and process for the preparation of such compounds.

Pyridyl represents a 3-pyridyl, 4-pyridyl, or particularly a 2-pyridyl group, which are preferably unsubstituted or may contain lower alkyl radicals, e.g. methyl or ethyl; nitro or amino groups, or halogen atoms, e.g. chlorine or bromine, as substituents.

Salts are particularly the therapeutically acceptable acid addition salts with inorganic acids, such as, for example, hydrochloric, hydrobromic, sulfuric or phosphoric acids, or strong organic acids, such as, for example, acetic, hydroxyacetic, methane sulfonic acid or the like. Mono- or bis-salts may be formed.

It has been found that the compounds of this invention and the salts thereof have remarkable tuberculostatic effects coupled with a low degree of toxicity and are, therefore, intended to be used as tuberculostatic agents of low toxicity in the treatment of infections caused by *Mycobacterium tuberculosis,* such as the human pathogenic strain H37 Rv of *Mycobacterium tuberculosis.* A pronounced tuberculostatic effect is shown by 1,3-diphenyl-2-thioureas, in which each of the phenyl radicals contains in the 4-position a 2-(2-pyridyl)-ethenyl group.

The new compounds may be used as tuberculostatic medicaments in the form of pharmaceutical preparations, which contain the new compounds or salts thereof in admixture with a pharmaceutical organic or inorganic, solid or liquid carrier suitable for enteral, e.g. oral, or parenteral administration. For making up such preparations there may be employed substances which do not react with the new compounds, such as water, gelatine, lactose, starches, stearic acid, stearyl alcohol, magnesium stearate, talc, vegetable oils, benzyl alcohols, gums, waxes, polyalkylene glycols, petroleum jelly or any other known carrier for medicaments. The pharmaceutical preparations may be in solid form, for example, as tablets, dragees or capsules, or in liquid form, for example, as solutions, emulsions or suspensions. If desired, they may contain auxiliary substances, such as preserving agents, stabilizing agents, wetting or emulsifying agents, salts for varying the osmotic pressure or buffers. They may also contain, in combination, other therapeutically useful substances, particularly other tuberculostatic agents, such as streptomycin, dihydro-streptomycin, isonicotinic acid hydrozide, 4-aminosalicylic acid, other thiourea derivatives, etc.

The 2-thioureas of this invention may be prepared by reacting an aniline which contains in the 4-position a group of the formula Py—$(CH=CH)_n$—, in which Py and $n$ have the above-given meaning, or a salt thereof, with thiophosgene or carbon disulfide, and, if desired, converting a resulting salt into a free base, and/or, converting a resulting base into a salt thereof.

The reaction is preferably carried out in the presence of a solvent, such as a lower alkanol, e.g. methanol or ethanol; or a halogenated hydrocarbon, e.g. chloroform. If carbon disulfide is used, a condensing reagent may be required; potassium ethylxanthate, iodine or sulfur are reagents, which have catalytic effects on the reaction. The latter may be performed at room temperature, if necessary, at an elevated temperature, for example, under reflux, with lower reaction time.

The starting materials used in the process for the invention are readily available in quantities; for example, the 4-[2-(2-pyridyl)-ethenyl]-aniline can be prepared by reacting 4-nitro-benzaldehyde with α-picoline, if desired, in the presence of a condensing reagent, such as acetic acid anhydride, and subsequently hydrogenating the nitro to the amino group.

Depending on the conditions, the 2-thiourea compounds of this invention are obtained in the form of free bases or as the salts thereof. A salt is converted into the free base, for example, by treatment with an aqueous alkaline reagent, such as an alkali metal hydroxide, e.g. lithium, sodium or potassium hydroxide; an alkali metal carbonate, e.g. sodium or potassium carbonate or hydrogen carbonate; or ammonia. A free base may be converted into a therapeutically acceptable salt thereof, for example, by reacting a solution of the base in a solvent, such as a lower alkanol, e.g. methanol or ethanol, with an acid or a solution thereof. Bases or salts may be obtained in hydrated form; mono- or bis-salts may be formed.

The following example illustrates the invention; temperatures are given in degrees centigrade.

Example

A solution of 15.7 g. of 4-[2-(2-pyridyl)-ethenyl]-aniline, 7.6 g. of carbon disulfide and 0.1 g. of potassium ethyl xanthate in 100 ml. of methanol is refluxed for two hours. A precipitate is formed after about 1½ hours, which is filtered off after cooling. The resulting 1,3-bis-{4-[2-(2-pyridyl)-ethenyl]-phenyl}-2-thiourea is recrystallized from a mixture of chloroform and petroleum ether, M.P. 190–192°.

When 4-[2-(2-pyridyl)-ethenyl]-aniline is replaced by 4-[2-(4-pyridyl)-ethenyl]-aniline or 4-[4-(2-pyridyl)-butadienyl]-aniline the 1,3-bis-{4-[2-(4-pyridyl)-ethenyl]-phenyl}-2-thiourea and the 1,3-bis-{4-[4-(2-pyridyl)-butadienyl]-phenyl}-2-thiourea, respectively, can be obtained according to the above-given procedure.

A salt of one of the above-described 2-thioureas may be prepared for example, by treating an ethanol solution of the free base with hydrogen chloride and diluting the solution with ether.

The 1,3-diphenyl-2-thioureas of this invention may also be prepared, for example, by reacting an aniline, which contains in the 4-position a group of the formula Py—$(CH=CH)_n$— in which Py and $n$ have the above-given meaning, or a salt thereof, with a phenylisothiocyanate, which contains in the 4-position a group of the formula Py—$(CH=CH)_n$— in which Py and $n$ have the above-given meaning, to yield the compounds of this invention. This procedure is particularly useful for the manufacture of asymmetric 1,3-diphenyl-2-thioureas, i.e. in which the two phenyl radicals contain different groups of the formula Py—$(CH=CH)_n$— in the respective 4-positions.

What is claimed is:

1. A member of the group consisting of 1,3-diphenyl-2-thiourea, in which each of the phenyl radicals is substituted in the 4-position by the group of the formula Py—(CH=CH)$_n$—, in which Py represents a member of the group consisting of 2-pyridyl, 3-pyridyl and 4-pyridyl, and $n$ stands for a whole number from 1 to 2, and therapeutically acceptable acid addition salts thereof.

2. 1,3-bis-{4-[2-(2-pyridyl)-ethenyl]-phenyl} - 2 - thiourea.

References Cited in the file of this patent

Schroeder: Chemical Reviews, vol. 55, pp. 192 to 195 and 206 to 209 (1955).